Mar. 27, 1923.

J. J. CAIN.
ADJUSTABLE HANDHOLE COVER.
FILED NOV. 18, 1919.

1,449,729.

Inventor,
John J. Cain.
By Alfred Shedlock,
Attorney.

Patented Mar. 27, 1923.

1,449,729

UNITED STATES PATENT OFFICE.

JOHN J. CAIN, OF BAYONNE, NEW JERSEY.

ADJUSTABLE HANDHOLE COVER.

Application filed November 18, 1919. Serial No. 338,811.

*To all whom it may concern:*

Be it known that I, JOHN J. CAIN, a citizen of the United States, residing at Bayonne, county of Hudson, State of New Jersey, have invented new and useful Improvements in Adjustable Handhole Covers, of which the following is a specification.

The salient feature of the hand hole cover of this invention is in making the holding or clamping means between the inner and outer parts or plates of the cover adjustable and in securely sealing up the adjustable joint of the holding means in the inner plate. The cover plates will thereby accurately seat against the surfaces of the boiler plate, and leakage through the joints will be avoided. The holding means consists, preferably, of a bolt provided with a head loosely seated in a recess in the inner plate in such manner that the bolt is free to rock or move in lateral directions but is held from rotation relatively to the inner plate. The opening of the recess in the inner plate is fully closed by welding or soldering a disc to the plate in such manner as not to interfere with the free play of the bolt in the plate. This may be accomplished by fusing into the edge of the disc and the adjacent parts of the plate a metal adapted to blend or coalesce with the disc and the plate under a suitable fusing heat.

In practicing this invention the proposed methods illustrated in the accompanying drawings may be adopted, in which.

Figure 1:
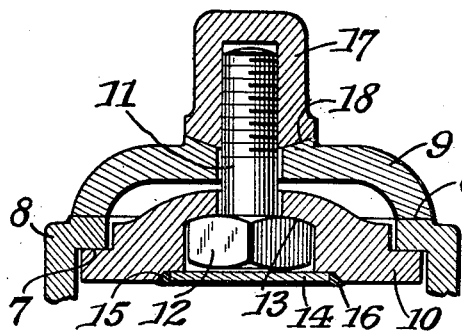
Fig. 1, is a vertical section of a hand hole cover, showing the adjustable plate holding means of this invention applied to an outside sealing joint.
Figure 3:
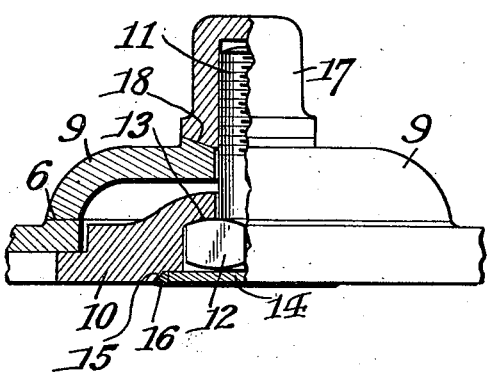
Fig. 3, is an elevation taken at right angles to Fig. 1, one half in full the other half in section.
Figure 2:
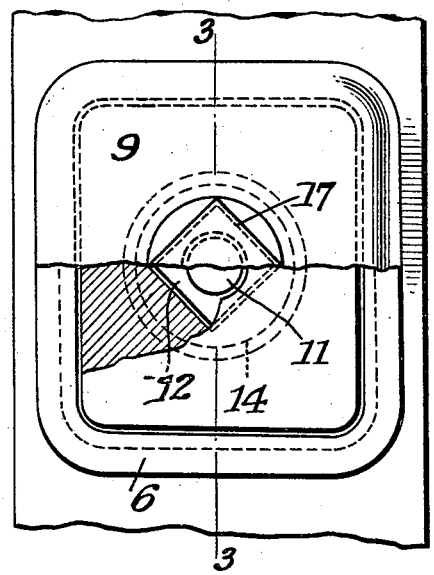
Fig. 2, is a plan view of the same partly in section.

Referring to Figs. 1, 2 and 3, 6 indicates the outside bearing and 7 the inside seating face surrounding an oblong hand hole in a plate or part 8 of a boiler. The outside cover or plate 9 is formed to seat against the face 6, the contacting surfaces being smoothly tooled. The inner plate 10 has a flange formed to seat against the inner surface of the boiler plate 8.

A bolt 11 passes loosely through a hole having a recess in the plate 10, to receive the head 12 of the bolt, the upper side of which is spherical and seats against the correspondingly shaped end of the recess, as indicated at 13, the arrangement being such that the bolt is free to rock, but is prevented from rotating in the plate by the head of the bolt and the recess being rectangular in shape.

To thoroughly close or seal the opening through the plate 10 a disc or plate 14 is intimately fastened to the plate, preferably by a welding process, said disc being shown located in a depression at the open end of the recess so as to leave a groove 15 around the disc, into which may be fused, by electrical heat or heat of acetylene, a metal adapted to blend or coalesce with the plate and disc, as indicated at 16. On the outer end of the bolt 11 is a socket nut 17, formed to make a tight joint with the plate 9, and to compensate for any angularity of the bolt their contacting surfaces may be made spherical, as indicated at 18. By this construction particular care need not be exercised in fitting the plate 10 to the face 7, as tight joints at 6 and 18 will be assured when the parts are clamped together by the nut 17.

Figure 4:
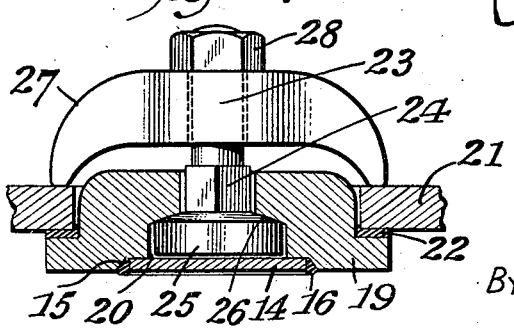
Fig. 4, illustrates the adjustable feature of the invention applied to a hand hole with an inside sealing joint.

The recess in the inner plate and the head of the bolt may be circular and a square formed on the bolt just above the head and located in a square hole in the plate to prevent the bolt rotating therein. This construction is shown in Fig. 4, which illustrates the application of the invention to a hand hole cover in which the closure joint is on the inside of a boiler plate. The closure plate 19 is here shown with a circular recess 20, and the joint between the plate 19 and the inner surface of a boiler plate 21 is made by a suitable packing 22. The bolt 23 has a square portion 24 just above the head 25, loosely located in a similar shaped hole in the plate; the head 25 is seated against the end of the recess by a spherical bearing surface, as shown at 26.

The outer end of the bolt 23 passes through a bridge piece 27, resting on the outside of the boiler plate 21, and their contacting surfaces need not be especially carefully tooled. The parts are held in closing position by an ordinary nut 28 on the bolt 23 bearing against the bridge piece 27. The bearing surfaces of nut and bridge piece may be flat as shown, or spherical if thought desirable. The spherical fitting, at 26, of the bolt head 25 and plate 19 need not be made steam tight, as it is proposed to suitably securely close the opening of the recess; for this purpose the plan above described, consisting of a plate or disc 14 welded in place as at 16, may be employed.

Figure 5:
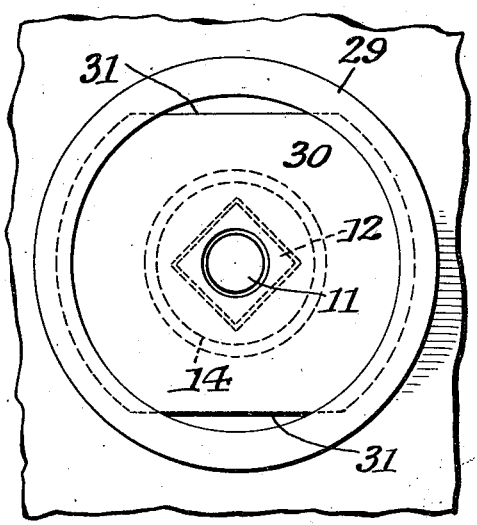
Fig. 5, is a plan view of a circular hand hole with the outside closing plate removed.

The hand hole cover illustrated in the main views of the drawings is of an oblong character, but, of course, the adjustable feature of this invention is applicable to hand holes of any shape. Fig. 5, shows a hand hole having a circular outside bearing surface 29, with the inner circular plate 30 formed with flat sides 31, to allow it to be passed into the hole from the outside. The outside cover plate and nut, which may be similar to those shown in Fig. 1, are omitted from this view.

Although the bolts and inner plates have loose fitting connections they will always be held properly assembled together by the sealing disc 14, and so avoid any inconvenience in applying the hand hole closures to boilers.

I claim:

1. An adjustable hand hole cover, comprising an inner and outer member adapted to seat against the inner and outer edges of a boiler plate hand hole, a bolt having a head seated in a recess in the inner member and formed to rock therein, and means for closing and sealing the recess of said member.

2. An adjustable hand hole cover, comprising an inner and outer member, the outer member being adapted to seat against the outer surface of a boiler plate surrounding a hand hole therein, a bolt having a rocking connection with the inner member and extending through the outer member and a nut on the bolt having a tight fitting bearing against the outer member.

3. An adjustable hand hole cover, comprising an outer member made to form a tight joint against the outer surface of a boiler around a hand hole therein, an inner member adapted to bear against the inner surface of the boiler plate, a bolt having a sealed adjustable connection with the inner member and extending through the outer member and a nut on the outer end of the bolt having a tight fitting bearing against the outer member.

4. An adjustable hand hole cover, comprising an inner and outer member adapted to bear against the inner and outer surfaces surrounding a hand hole, a bolt having a head formed to rock in a recess in the inner member and extending through the outer member, a socket nut on the end of the bolt having a spherical seat on the outer member and a disc adapted to close the opening of the recess in the inner member and securely fastened to the inner member by a welding or soldering process to seal said opening.

5. In an adjustable hand hole cover, a plate adapted to seat against the inner side of a plate around the edges of a hand hole in the plate and provided with a recess, a bolt projecting from said plate and having a rocking engagement with said plate with its head seated in said recess, and means independent of the head and of the first mentioned plate for sealing said recess.

6. In an adjustable hand hole cover, a plate adapted to seat against the inner side of a plate around the edges of a hand hole in the plate and provided with a recess, a bolt projecting from said plate and having a rocking engagement with said plate with its head seated in said recess, and means located below the bolt head and independent thereof for sealing said recess.

7. In an adjustable hand hole cover, a plate adapted to seat against the inner side of a plate around the edges of a hand hole in the plate and provided with a recess, a bolt projecting from said plate and having a rocking engagement with said plate with its head seated in said recess, and means located below the bolt head and independent thereof for sealing said recess, said sealing means being adapted to prevent the separation of the bolt and the plate.

8. In an adjustable hand hole cover, a plate adapted to seat against the inner side of a plate around the edges of a hand hole in the plate and provided with a recess, a bolt provided with a head located in said recess and projecting through an opening in said plate of less cross-sectional area than said head, and means independent of the head for sealing said recess.

Signed at New York, county and State of New York, this 14th day of November, 1919.

JOHN J. CAIN.

In the presence of—
J. C. LAURENCE,
ALFRED SHEDLOCK.